Figure 1:
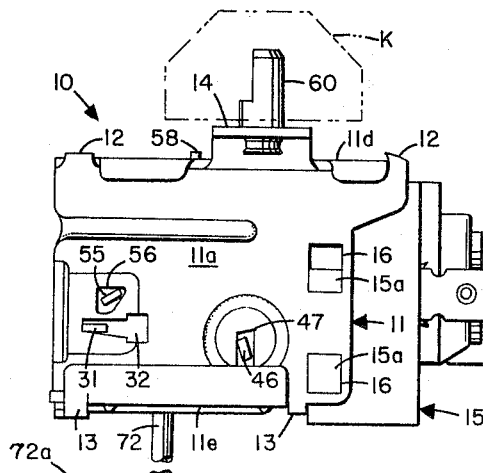

Aug. 23, 1966  J. LIEBERMANN ETAL  3,268,694
THERMOSTATIC CONTROL SWITCHES
Filed Jan. 20, 1964  5 Sheets-Sheet 1

INVENTORS
JOHN LIEBERMANN
THOMAS I. SYFERT
WILLIAM H. CROSWELL
WILLIAM S. TUFTS

BY Roy E. Kancy
ATTORNEY

Aug. 23, 1966   J. LIEBERMANN ETAL   3,268,694
THERMOSTATIC CONTROL SWITCHES
Filed Jan. 20, 1964   5 Sheets-Sheet 4

INVENTORS
JOHN LIEBERMANN
THOMAS I. SYFERT
WILLIAM H. CROSWELL
WILLIAM S. TUFTS
BY
ATTORNEY

Aug. 23, 1966  J. LIEBERMANN ETAL  3,268,694
THERMOSTATIC CONTROL SWITCHES
Filed Jan. 20, 1964  5 Sheets-Sheet 5

INVENTORS
JOHN LIEBERMANN
THOMAS I. SYFERT
WILLIAM H. CROSWELL
WILLIAM S. TUFTS

United States Patent Office 3,268,694
Patented August 23, 1966

3,268,694
THERMOSTATIC CONTROL SWITCHES
John Liebermann, Thomas I. Syfert, and William H. Croswell, Columbus, and William S. Tufts, Gahanna, Ohio, assignors to Ranco Incorporated, Columbus, Ohio, a corporation of Ohio
Filed Jan. 20, 1964, Ser. No. 338,677
1 Claim. (Cl. 200—140)

This invention relates to thermostatic control switches suitable for controlling the cyclical operation of refrigerators, air conditioners, and the like, and more particularly to improved snap acting control switches of the type actuated by a thermally expansible power element working against biasing means in the form of a load spring.

It is one important object of this invention to provide an improved thermostatic control switch of the type mentioned, having a pivoted toggle lever and a toggle spring for snap actuation of contact means, and wherein the pivot means of the toggle lever is free of forces and loads from the power element and load spring, the toggle lever pivot means being subjected only to the relatively light forces of the toggle spring, whereby uniformly repeatable operating characteristics are obtained.

It is another object of this invention to provide a particularly reliable and compact snap-acting switch construction of the foregoing character wherein the toggle lever is pivoted at one end to a frame for movement between first and second switch actuating positions and the toggle spring acts between the frame and the other end of the toggle lever to urge the toggle lever toward one of the actuating positions with increasing force as that position is approached, the toggle lever being in following engagement with an operating lever which is pivoted to the frame and is biased by load spring means against the thermally expansible power element, whereby the maximum forces acting along the toggle lever to its pivot means are limited to the relatively small forces of the toggle spring.

As another object this invention contemplates the provision of improved adjustable secondary load means for selectively varying one of the operating characteristics, such as "cut-in" temperature or "cut-out" temperature without varying the other, and without materially dampening the snap action of the switch irrespective of the setting of the secondary load means.

According to one embodiment of the present invention, there is provided a third lever, in addition to the first or toggle lever and the second or operating lever, the third lever being biased by an adjustable secondary load spring against a stop means providing a predetermined space between the third lever and the toggle lever when the latter is in its first position and irrespective of adjustment of the secondary load spring. As the toggle lever moves to its second position, it always traverses the same distance before picking up the third lever, whereby substantially the same degree of snap acting crispness is achieved throughout the range of adjustment of the secondary load means.

Figure 5:
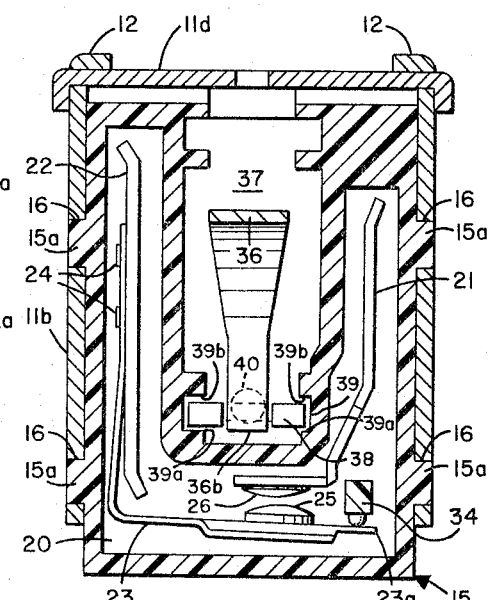
Figure 2:
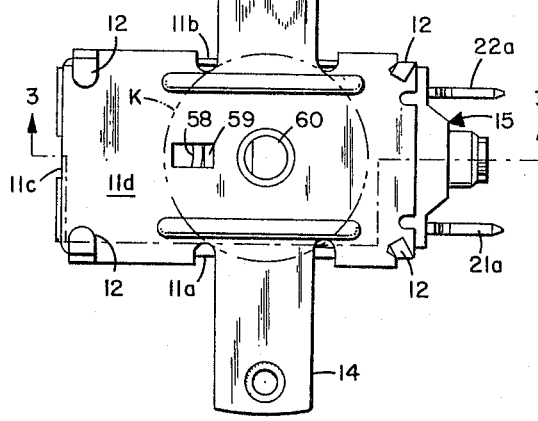
Figure 6:
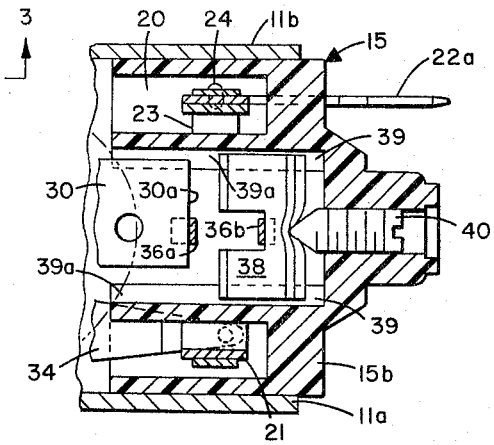
Figure 7:
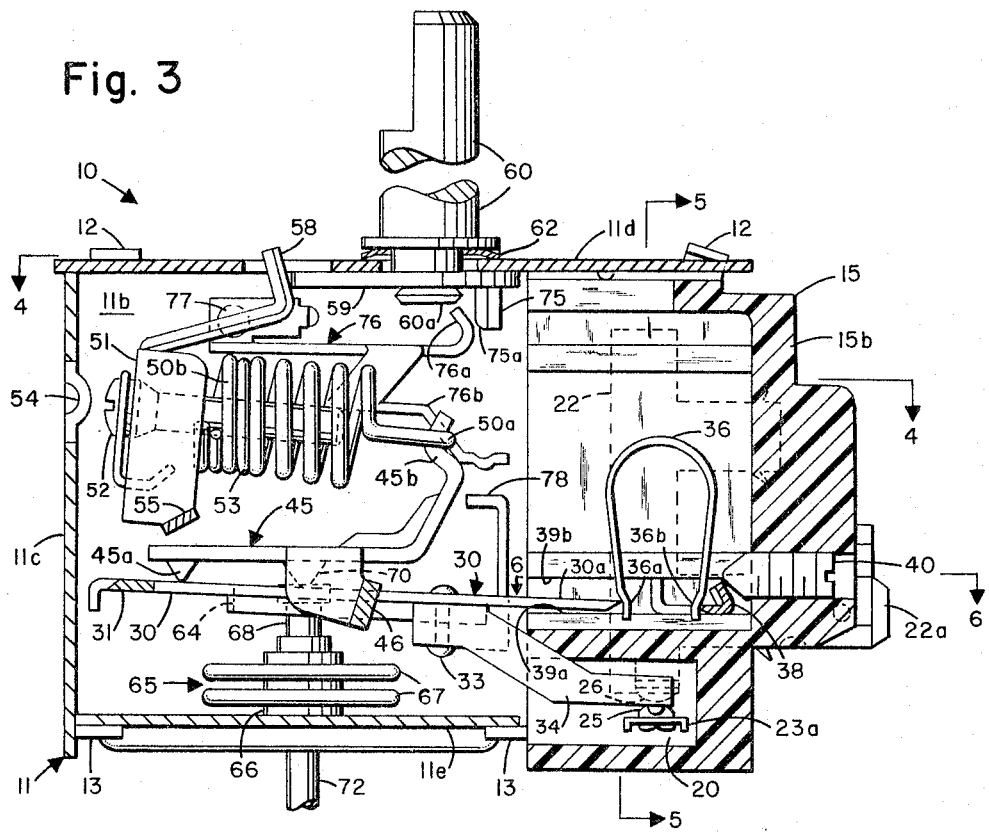
Figure 8:
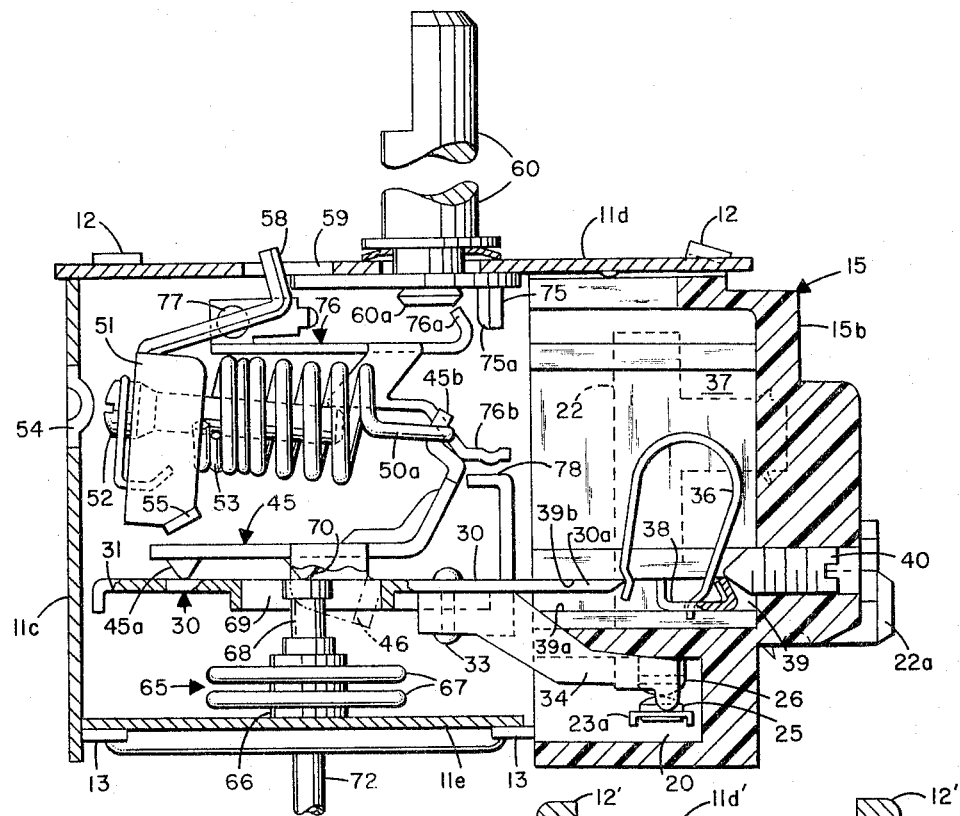
Figure 9:
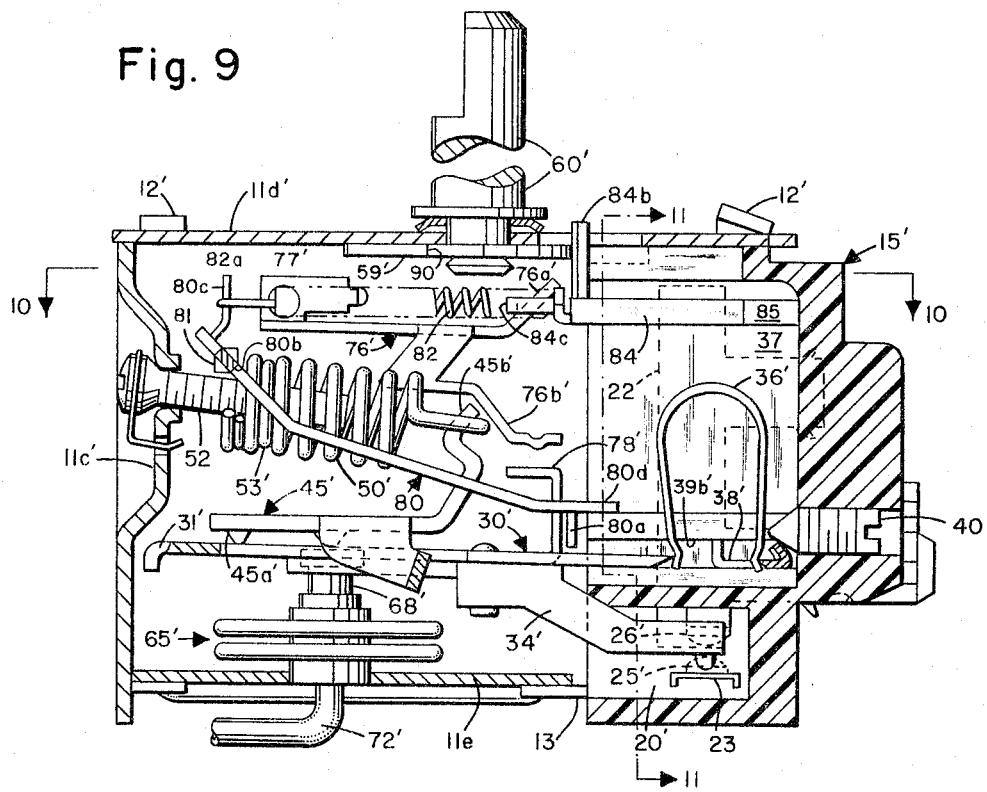
Figure 10:
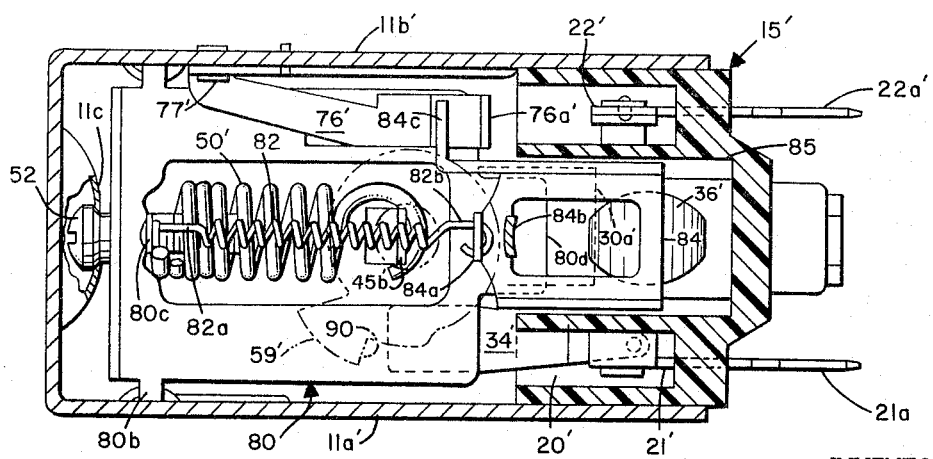
Figure 12:
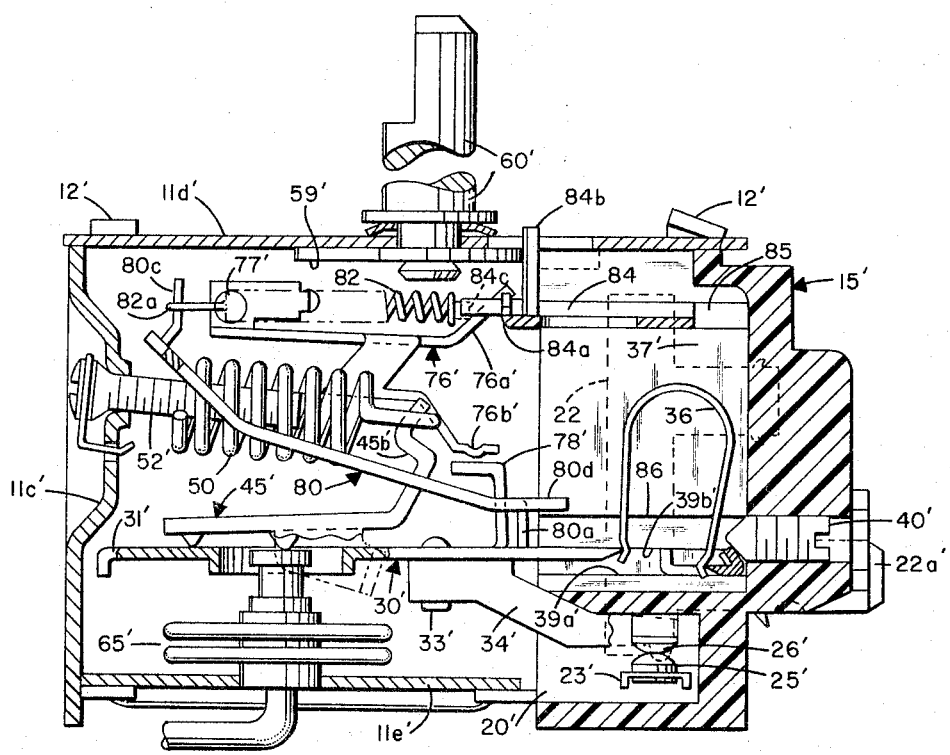

The invention may be further said to reside in certain constructions and arrangements of parts by which the foregoing objects and advantages are achieved, as well as others which will become apparent from the following detailed description of exemplary control switches embodying this invention, the description being read in conjunction with the accompanying sheets of drawings forming a part of this specification, and in which:

FIG. 1 is a side elevational view of a thermostatic control switch embodying this invention;
FIG. 2 is a plan view of the control switch of FIG. 1;
FIG. 3 is an enlarged sectional view of the control switch taken substantially along line 3—3 of FIG. 2;
FIG. 4 is an enlarged sectional view taken substantially along line 4—4 of FIG. 3;
FIG. 5 is a sectional view taken along line 5—5 of FIG. 3;
FIG. 6 is a fragmentary sectional view taken along line 6—6 of FIG. 3;
FIG. 7 is a sectional view similar to FIG. 3 but with parts in different operative positions;
FIG. 8 is a plan view of another form of control switch embodying this invention;
FIG. 9 is an enlarged sectional view taken substantially along line 9—9 of FIG. 8;
FIG. 10 is a sectional view taken along line 10—10 of FIG. 9;
FIG. 11 is a sectional view taken along line 11—11 of FIG. 9; and
FIG. 12 is a view similar to FIG. 9, but with parts in different operative positions.

In the form of the invention shown in FIGS. 1 through 7 there is provided an improved thermostatic control switch 10 comprising a sheet metal frame 11 having what will be referred to as parallel side walls 11a and 11b integrally connected by an end wall 11c, although it will be understood that the switch 10 does not require any particular orientation in use. The frame further includes a top wall 11d and a bottom wall 11e secured to the side walls 11a and 11b by bent-over tabs 12 and 13, respectively. The top wall 11d is provided with apertured ears 14 for convenience in mounting the control switch 10 to a panel or the like. An insulating member 15, formed of a suitable rigid material such as "Bakelite" is secured between the side walls 11a and 11b by lugs 15a extending through corresponding openings 16 in those side walls. The frame 11 and insulating member 15 together form a housing for snap acting switch means and related control elements described hereinafter.

Referring to FIG. 5, the insulating member 15 defines a U-shaped recess 20, in the leg portions of which are disposed metallic conductor members 21 and 22. The conductor member 21 has a portion extending through a wall 15b of the insulating member and terminating in a blade type connector 21a. Similarly, the conductor member 22 has a portion extending through the wall 15b and terminating in a blade type connector 22a. An L-shaped resiliently flexible contact arm 23 is secured at one end to the conductor member 22, as by rivets 24, and carries near the free end thereof a contact 25 which is movable into and out of engagement with a fixed contact 26 mounted on the conductor member 21. The contact arm 23 by its inherent resiliency normally holds the contacts 25, 26 closed to complete an electrical circuit therethrough, and is movable to separate the contacts to terminate the circuit by snap acting means described hereinafter.

The snap acting means includes a toggle lever 30, preferably formed as a sheet metal stamping and pivoted at one end to the frame 11 by laterally extending projections 31 having knife edges engaged in openings 32 in frame side walls 11a and 11b. The toggle lever 30 has secured thereto, as by rivet 33, an arm 34 formed of a rigid insulating material such as "Bakelite" and engageable with the free end 23a of the contact arm 23. The end of the toggle lever 30 opposite the pivotal connection thereof with the frame 11 is provided with a knife edged end 30a pivotally engaging one end 36a of a C-shaped toggle spring 36 disposed in a central recess 37 of the insulator member 15. The other end 36b of the spring 36 is engaged with a knife edged bearing member 38. The bearing member 38 is slidably disposed in grooves 39 opening into the recess 37 of insulating member 15, and is adjustably positioned through the agency of a screw 40 which is threadedly engaged in an opening through the insulator member. The screw 40 may be adjusted to position the bearing member 38 so as to increase or decrease the force exerted on toggle lever 30 by the toggle spring 36 and has the effect of increasing or decreasing the differential between the "cut-in" and "cut-out" temperatures of the switch. Accordingly, the screw 40 may be referred to as a differential adjusting screw.

The toggle lever 30 is limited to movement between first and second positions by the engagement of the end 30a thereof with the lower and upper side walls 39a, 39b of one of the grooves 39. In the first position, which is illustrated in FIG. 3, the toggle lever 30 engages groove wall 39a while the insulating arm 34 acts against end 23a of contact arm 23 to hold contacts 25, and 26 separated. In this position, the pivotal engagement between the knife edge end 30a of the lever 30 and end 36a of spring 36 is slightly above a line between the knife edges of pivot projections 31 and the knife edge of bearing member 38 engaging end 36b of the toggle spring. The toggle spring 36 therefore continuously urges the lever 30 toward a second position (FIG. 7) against wall 39b of groove 39 and in which position the insulated arm 34 is separated from the end 23a of contact arm 23, thereby allowing contacts 25 and 26 to be closed. Although the spring 36 constantly urges the lever 30 toward the second position against groove wall 39b, it does so with progressively greater force as the toggle lever nears the second position and with a progressively decreasing force as the toggle lever 30 is moved towards the first position against groove wall 39a. This factor results in snap acting movement of the toggle lever 30 and of the contacts 25, 26 in a manner which will become apparent as the description proceeds.

The toggle lever 30 is engaged, between its pivotal connection with the frame 11 and its knife edged end 30a, by a ridge 45a at one end of an operating lever 45 which has lateral extending projections 46 pivotally engaged in openings 47 in the side walls 11 and 11b. The operating lever 45 is biased in a counterclockwise direction as viewed in FIG. 3 by a load spring 50 having a hooked end 50a engaged with a hooked end 45b of the operating lever. The other end of the spring 50 is connected to a cam follower lever 51 by means of an adjusting screw 52 which extends through the cam follower lever and is threadedly engaged in a nut 53 lodged in the end convolutions 50b of the spring 50. The frame end 11c is provided with an opening 54 for admission of a suitable tool for adjusting the screw 52 to select a range of temperatures within which the switch may operate.

The cam follower 51 has laterally extending projections 55 engaged in openings 56 in the side walls 11a and 11b, and includes a cam follower portion 58 which rides on the periphery of a cam 59. The cam 59 is secured to the inner end of a shaft 60 which is journaled in an opening 61 of the top wall 11d and retained therein by a spring clip 62. It will be recognized that rotation of the shaft 60, such as by suitable knob K, will effect rotation of the cam 59 and positioning of the cam follower lever 51 to select the force with which spring 50 causes lever 45 to act upon the toggle lever 30 in a direction opposite to the effect of toggle spring 36. Positioning of the cam 59 selects the temperatures to which the switch will respond within the range selected by screw 52. In this regard it is to be noted that both the cut-in and cut-out temperatures are increased or decreased by the same amount by adjusting of the screw 52 or the cam 59 to vary the tension of spring 50. That is to say, the differential between those temperatures remains substantially the same when the cam 59 or screw 52 are adjusted.

In order to effect movement of the lever 45 in a clockwise direction so as to permit toggle lever 30 to be moved toward its second position by spring 36 for effecting closing of the contacts 25, 26 there is provided a thermally expansible power element in the form of a bellows generally indicated at 65. The bellows 65, which may be of any construction well known in the art to which the invention pertains, includes in this example a base member 66 secured to the bottom wall 11e, a pair of hollow expansible wafers 67, and a bellows post 68 extending through an opening 69 in the toggle lever 30 and engaging a ridge 70 on the operating lever 45, as is best illustrated in FIG. 7. The interior of the bellows 65 is in communication with a capillary tube 72, the end 72a of which is sealed, and the bellows and tube 72 contain a suitable fluid which expands and contracts with increases and decreases in temperature to effect corresponding axial movement of the bellows post 68 against the load imposed by the spring 50 through the operating lever 45.

When the toggle lever 30 is in the position shown in FIG. 5 with the contacts 25, 26 in their open position, an increase in temperature experienced by the capillary tube 72 to a predetermined "cut-in" temperature will increase the fluid pressure therein until the force exerted through the bellows post 68 just overcomes the force exerted at the projection 70 by the spring 50, whereupon the operating lever 45 will begin to move in a clockwise direction toward its second position against groove wall 39b. Because the toggle lever 30 is always urged by toggle spring 36 towards its second position, and because the toggle spring exerts an increasing force as the second position is approached, the toggle lever will be accelerated in its movement to the second position thereby effecting snap actuation of contacts 25, 26 to their closed position.

Further increases in temperature experienced by the capillary 72 and effecting expansion of the bellows 65 will result only in movement of the ridge 45a of lever 45 away from the toggle lever 30 and will impose no stresses on the lever 30 or its knife edged projections 31 bearing in the openings 32.

Thereafter, when the capillary tube 72 experiences decreasing temperatures the bellows 65 will contract, allowing spring 50 to rotate lever 45 in a counterclockwise direction and bringing the ridge 45a thereof into engagement with the toggle lever 30. When the rotative forces exerted on operating lever 45 by the bellows 65 and by the toggle spring 36 through the toggle lever 30 become less than the force exerted by the spring 50, the operating lever will begin to move the toggle lever toward its first position. As the toggle lever begins to move from its second position toward its first position the effective force of spring 36 will decrease in an accelerating manner thereby allowing the spring 50 to move the toggle lever 30 to its first position with a snap action which is transmitted to the contacts 25, 26 to effect opening thereof.

It is to be noted that the maximum forces acting along the toggle lever 30 do not exceed the relatively small force of the toggle spring 36 thereon. Accordingly, the pivotal connection of the toggle lever 30 through projections 31 is virtually free of wear or distortion, thereby resulting in a control switch the repetitive operating characteristics of which will remain constant over long periods of use.

At times it is desirable to be able to turn the switch to a full "off" condition irrespective of the temperature sensed by the capillary 72. To this end, the cam 59 is provided with a downwardly extending projection 75, as viewed in the drawings, having a cam surface 75a which is engageable with an upturned end portion 76a of a spring arm 76. The spring arm 76 is conveniently riveted at 77 to the side wall 11b and has an offset, resiliently flexible arm portion 76b. The end of arm portion 76b overlies an upwardly extending, rigid member 78 which is conveniently formed integrally with lever 30.

When the shaft 60 is turned to an "off" position, which may be indicated by a suitable index mark on knob K, the projection 75 displaces the end portion 76a of spring arm 76 so that offset arm portion 76b engages the member 78 and biases the toggle lever to its first or contact opening position with a snap action and irrespective of the temperatures sensed by the capillary 72. Because of the snap action and because the operation of arm 76 against member 78 introduces no frictional resistance to movement of the toggle lever 30, any likelihood of "frying" the contacts by mere incipient opening thereof is eliminated.

Another embodiment of the invention is illustrated in FIGS. 8 through 12 wherein parts corresponding to parts of the foregoing embodiment are designated by corresponding reference numerals with a prime mark added. The operating characteristics of which embodiment of the invention, generally indicated at 10', differ from the preceding embodiment in that rotation of the knob K' and shaft 60' effects only the temperature at which the contacts 25', 26' open, the control therefore being known as a constant cut-in and variable cut-out type. In this form of the invention the end 50b' of load spring 50' is connected directly to end wall 11c' of the frame 11' by screw 52' extending through an opening in the end wall. The end 50a' of the load spring acts through lever 45' on the toggle lever 30' and is engageable by the bellows post 68' of bellows 65'. When the toggle lever 30' is in its first position as illustrated in FIG. 9, with the contacts 25', 26' open, an increase in temperature to a predetermined cut-in temperature sensed by capillary 72' will cause the bellows 65' to begin to move lever 45' in a clockwise direction about pivots 45', thereby allowing the toggle spring 36' to effect snap acting movement of the toggle lever 30' to its second, or FIG. 12 position in which contacts 25', 26' are closed. Thus, the cut-in temperature of the switch 10' is governed by the loading effect of the spring 50' and this may be varied by adjusting the screw 52'.

As the toggle lever 30' moves to its second position against groove wall 39b' it engages a down-turned lug 80a of a secondary load lever 80 which is pivoted to the frame by laterally extending projections 80b engaged in openings 81 in the frame side wall 11a' and 11b'.

The lever 80 is biased in a clockwise direction by a secondary load spring 82 having one end 82a engaged in a projection 80c of the lever, and having its other end 82b connected to a hook 84a to a cam follower slide 84. The cam follower slide 84 is reciprocably supported in grooves 85 in the insulator member 15' and includes an upwardly projecting cam follower portion 84b which rides on the periphery of a cam 59'. The cam 59' is secured to the inner end of the shaft 60' journaled in top wall 11b' and may be rotated by means of the knob K' to position the cam follower 84 and selectively vary the tension of secondary load spring 82. The lever 80 is limited in its clockwise direction of rotation under the influence of spring 82 by engagement of end 80d of the lever with a shoulder 86 of the insulating member 15'.

When the toggle lever 30' is in its second, or FIG. 12 position against groove wall 39b' with contacts 25', 26' closed, the end 80d of the lever 80 is held in spaced relation to the shoulder 86 by engagement of the lug 80a with the toggle lever. The toggle lever 30' is thereby subjected to a biasing effect in a clockwise direction by the spring 82 acting through the lever 80. When the temperature experienced by the capillary tube 72' is reduced to the temperature at which the bellows 65' allows the springs 50' and 82 to overcome the force of toggle spring 36', the toggle lever 30' is snapped to its first position against groove wall 39a', thereby opening the contacts 25', 26'. During this movement, the end 80d of lever 80 engages shoulder surface 86, thereby arresting movement of lever 80 and allowing the toggle lever 30 to separate therefrom.

By reason of the foregoing construction, the bellows 65' acts against only the force of load spring 50' when moving the lever 45' to allow the toggle lever to effect closing of the switch contacts and, is acted upon by the forces of both springs 50 and 82 when effecting opening of the contacts. It will be recognized, therefore, that adjustment of the tension of spring 82 by rotation of shaft 60' will only affect the "cut-out" or opening temperature characteristic of the device 10'.

At this point it should be noted that when the toggle lever 30' is in its first or FIG. 9 position, the space or gap between the lug 80a of the secondary load lever and the toggle lever is the same irrespective of the adjustment of tension of spring 82. Thus, the toggle lever 30' always traverses the same distance before picking up the secondary load, thereby minimizing the damping effect of load lever 80 and maintaining substantially constant the crispness of the snap-action of the toggle lever and the contacts throughout the range of adjustment of the spring 82.

Of course, the screw 40' may be adjusted to vary the effect of the toggle spring 36' which opposes the action of spring 82 through lever 80 when the switch is in the closed contact condition. Accordingly, the screw 40' may be used to select the range in which shaft 60', cam 59' and spring 82 are effective to vary the cut-out temperature.

As in the previously described embodiment, the maximum forces acting along the toggle lever 30' do not exceed the relatively small force of the toggle spring 36' thereon so that wear, distortion and the like are minimized.

In order to permit the switch 10' to be turned to an "off" condition irrespective of the temperatures sensed by capillary 72', a spring arm 76' is riveted at 77' to the wall 11b. The arm 76' has an end portion 76a' which slopes upwardly and is engageable by an outturned tab 84c of slide 84, and has an offset, resiliently flexible arm portion 76b'. The end of the arm portion 76b' overlies an upwardly extending, rigid member 78' which is conveniently formed integrally with toggle lever 30'.

The contour of the cam 59' is such that when rotated to bring a stop surface 90 thereof against the cam follower 84b, the tab 84c of slide 84 will displace the spring arm 76' so that portion 76b' thereof acts on member 78' and biases the toggle lever 30' to its contact opening position with a snap action irrespective of the temperatures sensed by the capillary 72'.

Although the invention has been described in considerable detail with reference to specific control switches embodying the invention, it will be understood that the invention is not limited thereto, but rather includes all those modifications, adaptations, substitutions, and uses as are reasonably embraced by the scope of the claim hereof.

Having described our invention, we claim:

A thermostatically operated electric switch comprising a frame, switch contact means supported on said frame, a first lever pivoted to said frame and movable between first and second positions actuating said switch means, spring means constantly urging said member towards said first position with increasing and decreasing forces on said lever as said lever approaches and moves from said first position, respectively, shoulder means on said frame engaged by said lever to limit movement of said lever in said first position, means to load said lever to oppose the force of said spring means thereon and to move said lever to said second position, a thermally responsive expandible means mounted on said frame and applying a force to move said lever towards said first position, said means comprising a second lever pivoted to said frame and disposed adjacent and generally co-extensive with said first lever and engaging a part thereof to urge said first lever towards said second position, spring means urging said second lever into engagement with said first lever and comprising a tension spring disposed generally co-extensive with said levers, a third lever pivoted to said frame and extending generally parallel with said levers and tension spring, said third lever having a central opening receiving said extension spring, spring means biasing said third lever in a direction about its pivot to urge one end towards said first lever and comprising a second tension spring extending generally parallel to said levers, stop means supported by said frame and engageable by said third lever to limit movement of said third lever about its pivot by the last mentioned spring means, a finger extending from said third lever towards said first lever and spaced from said first lever when said first lever is in said second position and said third lever engages said stop means and engaged by said first lever when the latter moves towards said first position, and means to adjust the tension of said second tension spring.

References Cited by the Examiner

UNITED STATES PATENTS 3,096,419   7/1963   Howell _____ 200—140

BERNARD A. GILHEANY, *Primary Examiner.*

ROBERT K. SCHAEFER, *Examiner.*

G. MAIER, *Assistant Examiner.*